United States Patent [19]

Metz

[11] Patent Number: 4,641,482

[45] Date of Patent: * Feb. 10, 1987

[54] HEAT STATION FOR A HEAT SEALING SYSTEM

[75] Inventor: Bruce E. Metz, Wilmington, Del.

[73] Assignee: Athena Controls Inc, Plymouth Meeting, Pa.

[*] Notice: The portion of the term of this patent subsequent to Apr. 24, 2001 has been disclaimed.

[21] Appl. No.: 433,001

[22] Filed: Oct. 6, 1982

[51] Int. Cl.⁴ .............................................. B65B 51/12
[52] U.S. Cl. ..................................... 53/388; 53/379; 156/583.3; 219/243
[58] Field of Search .................. 53/463, 379, 388; 219/243; 156/583.3

[56] References Cited

U.S. PATENT DOCUMENTS

| | | | |
|---|---|---|---|
| 1,492,707 | 5/1924 | Gallea | 53/388 |
| 2,629,808 | 2/1953 | Ulmschneider | 219/243 |
| 2,963,838 | 12/1960 | Harrison | 219/243 X |
| 3,010,267 | 11/1961 | Richardson | 53/388 X |
| 3,057,125 | 10/1962 | Jensen | 53/379 |
| 3,067,309 | 12/1962 | Chinn | 219/243 |
| 3,115,731 | 12/1963 | Blythe | 53/463 |
| 3,166,462 | 1/1965 | Schoder | 53/463 X |
| 3,236,027 | 2/1966 | Schmermund | 53/379 X |
| 3,531,621 | 9/1970 | Beck | 219/243 |
| 4,445,025 | 4/1984 | Metz | 156/583.7 |

Primary Examiner—John Sipos
Attorney, Agent, or Firm—William E. Cleaver

[57] ABSTRACT

The present invention includes at least one low mass flexible heat transfer member to which there is secured a plurality of electrical resistance paths, for each area of the material to be sealed during an excursion through the heat station. The electrical resistance paths are respectively connected to a power source, or power sources, to generate different quantities of heat respectively at different positions along the heat transfer member. The heat transfer member is flexible and is formed and disposed to push against sealable material to transfer heat thereto and cause said sealable material to be sealed.

11 Claims, 4 Drawing Figures

HEAT STATION FOR A HEAT SEALING SYSTEM

BACKGROUND

When packaged items such as cigarettes, boxes of throat lozengers, packages of candies and the like, are packaged in accordance with the prior art, such packages are transported through a system wherein first the package is formed or folded to receive the cigarettes, candy, etc., secondly the packages are filled with the foregoing items, thirdly each package is wrapped in cellophane or plastic that is sealable material, and finally the packages are moved to a heating station or a sealing station whereat the sealable material is heated and pressed so that it seals the package to keep moisture thereout. In the prior art the heat station has been composed of a pair of heavy rigid metal blocks, serving as the heat transfer members and within each of these blocks there is located a heating element and a thermocouple.

The heat transfer blocks are disposed so that when a package is carried through the heating station the ends of the package rub against the heat transfer blocks and thus heat is transferred to the cellophane or plastic material so that these ends of the package heat up and are pressed together to become sealed. Such prior art heating stations have had a number of undesirable characteristics.

For instance, the heat transfer surface presented by the heated block of metal in the prior art is rigid and does not "follow" contours of the package, but instead the package must conform to the surface of heavy metal blocks. If a package should be shorter than the specified length or desired length the package is very often not properly sealed because heat and pressure have not been adequately supplied to the sealable material. On the other hand, if the package is longer than the desired specification the package ends are very often torn with the heavy rubbing against the heavy metal blocks. In addition as the work surface of the heavy metal blocks wear, (from the rubbing of the packages thereagainst), the surfaces of the heat transfer blocks may become uneven and the heat applied to the package becomes uneven leaving unsealed portions. Further, in addition, such heavy mass heating stations have inherent problems because of their high thermal inertia. The high thermal inertia characteristic has been a major factor in improperly heating packages at the beginning of a package sealing run and/or overheating such packages at the end of the excursion through the heat station.

To better understand the foregoing infirmity in the prior art devices, it should be understood that in order to seal the material which is to be sealed, that material should be heated to a point where it is partially "melted", or tacky, or adhesible, or fusible. The partially melted material layers are then pressed together and in effect fuse into one another to form, upon cooling, a seal. The task is to render the material in the fusible state by the proper amount of heat without destroying the material by too much heat. It should be borne in mind that the material, which is to be sealed, is wrapped around a package and that package acts as a heat sink. The package conducts heat away from the source. It follows that when a "cold" package first enters the heat station it acts to conduct heat from the source more readily than it conducts heat further along the excursion through the heat station. Accordingly the amount of heat which is present, (in the layers to be adhesed, or fused, at the beginning of the excursion through the heat station), is relatively small when compared to the heat available at the initial position of the heat station. If we consider the profile of the heat present, in the material which is to be sealed, as that material travels through the heat station we find that it is not a flat profile, as would be desirable with prior art heating station equipment. Instead the profile is a ramp shaped profile, which rises (in the amount of heat present) as the material moves through the heating station. The material which is to be sealed must be rendered partially melting within a thermal window. If the applied heat is too great the material is destroyed and if the applied heat is too little the material will not become adhesable or fusible. The upper and lower limits of the ramp profile described above must fit within the thermal window and these constraints have given rise to problems in the prior art. The solution does not lie in providing a higher heat to overcome the initial "cold" state problem with prior art equipment because with such equipment the "heat present", at the end of the excursion through the heat station, is destructive, i.e. the ramp profile dictates that the high end is beyond the limits of the thermal window. In the prior art the problem has been dealt with by extending the heat exposure time, by either extending the length of the heat station (thereby providing a longer heat transfer period) or by transporting the packages at a relatively slow rate.

In addition because in the prior art the packages rub against the surface of the heat transfer means without having such heat transfer means "give", there resulted, very often, a tearing of the package.

The present heating station is formed to overcome the problems inherent in an inflexible, heavy mass heat transfer means.

SUMMARY

The present device employs low mass heating elements. A stainless steel flexible strip, or a bronze flexible strip, or some other suitable metal, plays the role of the heat transfer means and is disposed to come into contact with the ends of the package whereat the material to be sealed is found. On the side of the stainless steel strip which does not come into contact with the package, there is located a number of segments of electrical resistance material. Each segment of electrical resistance material is formed so that it can be connected to have its own electrical energy supplied thereto, and so that the heat, i.e. the temperature along of the stainless steel strip may be intentionally nonuniform. In effect the heating of the stainless steel strip is zoned. In this way when the package which is to be sealed first enters into the heating station a relatively large amount of heat is applied thereto to quickly overcome the cold status (lack of heat) of the package. As mentioned above the package is cold when it first enters the heating station. The zoned heating feature enables the present heating station to apply lesser amounts of heat as the package travels along the heating station. The flexible heating member is held in tension: (1) by effectively spring loading its ends; and (2) by exerting pressure along its length in response to leaf springs which cause the flexible heat transfer member to come into contact with the package being transported or traveling through the heating station. However the spring loading (by the leaf springs) along the length of the strip is such that the strip is flexible and readily follows the contour of the ends of the package. The stainless steel strip can be readily removed from the heating station and readily mounted which enables the user to clean the heating station or replace the heating member as is necessary from time to time.

The objects and features of the present invention will be better understood in view of the following description taken in conjunction with the drawings wherein.

Figure 1:
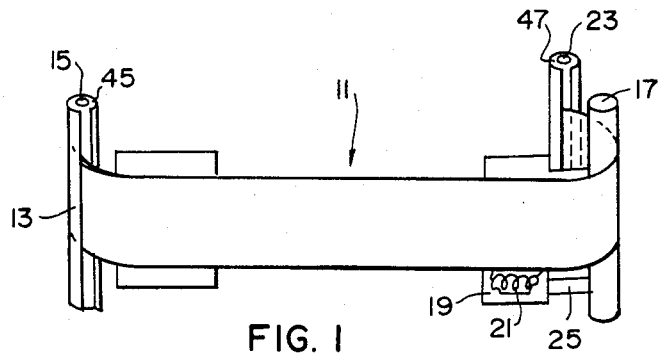
FIG. 1 is a pictorial schematic depicting one low mass flexible heat transfer element and some of the support members therefor.

Consider FIG. 1. In FIG. 1 there is shown a low mass flexible heat transfer member 11. The low mass heat transfer element 11 includes, in the preferred embodiment, a stainless steel steel strip 13. The stainless steel strip is heated from the back of the strip (which will become more apparent from the discussion of FIG. 2) and provides heat, i.e. transfers heat, to the front surface shown in FIG. 1 so that when the sealable ends of the package, such as depicted in FIG. 3, are moved along that surface, heat is transfered to those sealable ends. Such heat is transferred for a sufficiently long period of time such that the ends become relatively soft or tacky and when they are pressed together they actually seal. It should be understood that other forms of flexible metals could be used. Brass is a very good substitute for stainless steel in that it is readily available and is a good heat transfer medium. In FIG. 1 there are shown two studs 15 and 17. The stud 15 is locked into position as shown. The stud 17 is spring loaded in the housing and this is depicted by the cutaway portion of the housing 19 wherein there is shown a spring 21. Actually there are three mounting links, such as link 25, holding the stud 17 in position. Each of these mounting links such as link 25, is spring loaded by a spring similar to the spring 21. This in effect forces the mounting stud 17 to the right as shown in the drawing. The flexible strips are locked onto mounting pins, as will be more readily understood in connection with the description of FIGS. 3 and 4, and these mounting pins are located in holes in the housing. This arrangement enables flexible heat transfer member 11 to be pushed into tension around the studs 15 and 17.

Figure 2:
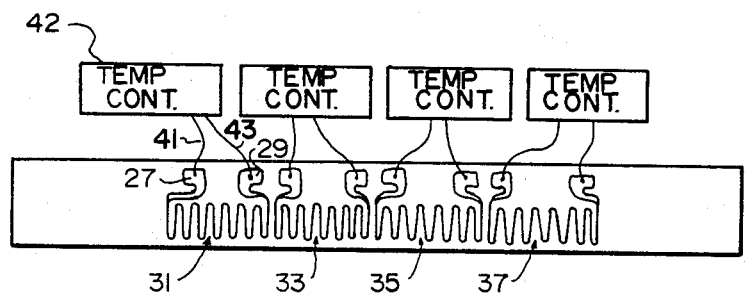
FIG. 2 shows the reverse side of the flexible heat transfer element of FIG. 1 with the meandering electrical resistance paths mounted thereon.
Figure 3:
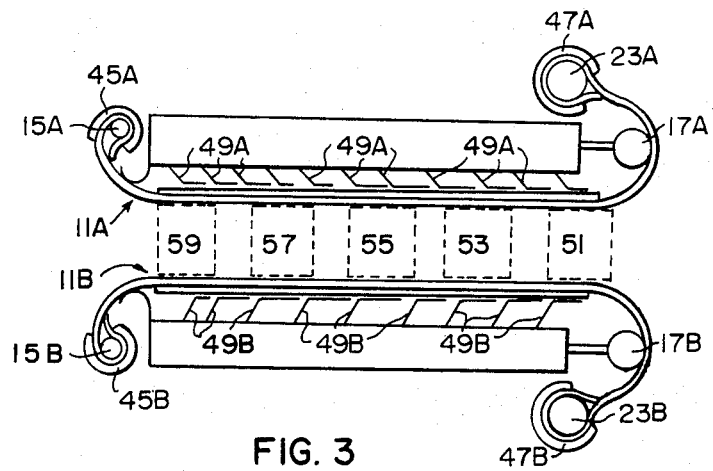
FIG. 3 is a top view of the layout of the heating station showing two flexible heat transfer members mounted with tension being provided at the ends and along the length thereof.

In FIG. 2 there is shown the reverse side of the flexible heat transfer member 11 shown in FIG. 1. On the reverse side of the flexible mounting member 11 there is secured a plurality of individual resistor elements. As can be seen in FIG. 2 there are shown four such meandering paths of resistance material and each of these meandering paths represents an individual heat generating means. As can be seen in FIG. 2 the meandering paths terminate in terminal patterns, such as the terminals 27 and 29 of the first resistor segment 31. Each of the other resistor segments 33, 35, and 37 are similarly formed. The resistor elements are individually formed by etching the material from a piece of copper or some other suitable electrical resistance material. The resistor elements, or paths, are then housed in insulating material KAPTON and the housing of the KAPTON material is secured, to make up the reverse side of the flexible heat transfer member 11, by a silicone adhesive. The silicone adhesive material and the KAPTON material are each used because they can withstand the high temperatures that are in effect because of the heat generation of the resistor segments 31, 33, 35, and 37. In addition each of the materials KAPTON and silicone is an electrical insulator so that there are no short circuits created between the resistor elements 31, 33, 35, and 37 with any other portions of the machine. KAPTON is a product of the DuPont Company. It should be understood that other high temperature material can be used. Further as can be seen in FIG. 2, there are shown two outside leads 41 and 43 which are electrically connected to the terminals 27 and 29. It should be understood that each of the other terminals for each of the other electrical segments 33, 35 and 37 has similar outside leads connected thereto which in turn are connected to electrical power sources, such as temperature controller 42, to provide energy to those particular resistor segments. It should be understood that a single power source with a properly designed resistor network could be used to provide electrical energy to all of the resistor elements. In the preferred embodiment a group of Athena Series 6800 Temperature Controllers are employed, to provide energy to those particular resistor segments. The arrangement of the electrical resistor segments, as shown in FIG. 2, effects a zoned heating characteristic along the heat transfer member.

The zoned heating feature provided by the arrangement of the electrical resistors 31, 33, 35 and 37 enables the system to readily provide relatively large amounts of heat to the package to be sealed when it first enters the heating station and lesser amounts of heat thereafter. This is very useful because the package comes in "cold" i.e., lacking heat and therefore a great deal of energy has to be transferred to the package or to the sealable material in order to activate that material to be sealed. If the heat provided to the package were uniform along the heat transfer member, as is true in the prior art, then the package must remain in the station for a considerably longer period of time and this of course limits the number of packages which can be transported through the system and be sealed. If for instance the package were traveling from left to right, as shown in FIG. 2 or in FIG. 3, then the first resistor segment 31 would be generating a large amount of heat so that when the package first enters the heating station the "cold" status is readily overcome. At each of the following zones lesser amounts of heat are supplied but a sufficient amount of heat is supplied so that the sealable material is in fact sealed by the time it leaves the end of the transfer member 11. Because of this nonuniform heating along the heat transfer member, I have found that the machines can operate at a very high speeds, much higher than the prior art, and of course this is a very desirable aspect of this particular system. It should be further noted that the effectiveness of the nonuniformity heating (i.e. the zoned heating), along the heat transfer member is in large measure made possible because the heat transfer member is a low mass and the inherent inertia problem described earlier in connection with the prior art is not present in the present system.

Figure 4:
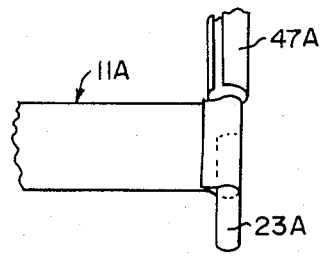
FIG. 4 depicts the mechanical means to readily mount the flexible heat transfer element in the present system.

FIG. 3 shows a top view of the heating station. In FIG. 3 it can be seen that the low mass flexible heat transfer members 11A and 11B are made up of two segments. In FIG. 3 the size of the segments are exaggerated in order that the makeup of the present system can be readily understood. Actually the thickness of the stainless steel 16 is 0.005 inches and the thickness of the KAPTON material 14 which houses the electrical resistance paths is 0.005 inches. The low mass flexible heat transfer member is looped around on itself while stud 15 and stud 23 are passed through those loops. An examination of FIG. 4 makes the role of the studs 15 and 23 more readily understood. In FIG. 4 the stud 23A is shown and the low mass flexible heat transfer member 11A is shown being looped on itself. Over each looped transfer member and over each stud located within the associated loop, there is slid a slotted hollow tube such as tubes 45 and 47. The slotted hollow tube 47A can be better appreciated by examining FIG. 4. The slotted hollow tube 47A slides over the looped heat transfer member and locks that member onto itself around the stud 23A. The slotted hollow tube is then inserted into an aperture in the housing and holds the flexible heat transfer member in the position shown in FIG. 3. It will be noted that the flexible member 11A is passed around the spring loaded stud 17A and this arrangement holds the flexible heat transfer member in tension. However as the flexible heat transfer member takes up its position in tension it comes in abutement with the leaf springs 49. The leaf springs 49 are stainless steel springs in the preferred embodiment but can be other suitable spring material. These leaf springs tend to force the flexible heat transfer member toward the middle of the package path. The push of the leaf springs 49 and the positioning of the leaf springs 49 is chosen such that the flexible heat transfer member in fact will be in the path of the packages such as packages 51, 53, 55, and 57. Accordingly those packages will come in contact with the heat transfer members. As these packages traverse the heat station they rub against the wear surfaces 13A and 13B and have heat transferred thereto to effect the sealing of the sealable material. The leaf springs cause the heat transfer member to push against the edges of the package but at the same time the leaf springs enable the flexible member to follow the contour of the packages which provides maximum heat transfer at the same time mitigates any likelihood of tearing the packages by severe rubbing, as was true in the prior art.

Further as can be seen in FIG. 3 there is shown a second flexible heat transfer member 11B. Flexible heat transfer member 11B is mounted in identical fashion as flexible heat transfer member 11A and each of the parts required for the mounting of the flexible member 11B are identified with the same numbers except that there is a "B" in the further identification number as compared to "A."

The present heating station is designed with low mass heat transfer members that are readily mountable and dismountable and which have zoned heating features and which apply flexible pressure along the excursion of the package through the heating station. All of these features are different from the prior art and provide an advance in the heating station art. The low mass heat transfer member eliminates the problems that are inherent with heat inertia characteristics of the prior art heating station as described earlier. The zoned heat enables packages, which are to be sealed, to be heated quickly as they enter the station so that a requiste time for effecting sealing of sealable material is possible without increasing the excursion time through the heat station. This feature enables the machine to be run at higher speeds. In addition the heating stations of the prior art can be removed and the present heating station can replace those prior art stations and still provide the benefits suggested in this description. The use of the leaf spring behind the heat transfer member to insure that each of the packages has full measure of heat energy transferred thereto and which simultaneously follows the contours of the packages further aids in providing a high speed operation while providing maximum yield with respect to the number of packages which are properly sealed in a given period of time. The low thermal inertia of the heating system along with the zoned heating permits intensional temperature adjustment while the packaging machine is operating to compensate for speed changes and/or material variations.

It should be understood that the foregoing description did not deal with the means to transport the packages to be sealed. Such transport means is not part of the invention and are well understood by persons skilled in the art.

I claim:

1. A sealing station having an entrance location and an exit location for sealing at least part of some sealable material which makes up at least part of a package, wherein said package is moved along a path through said sealing station comprising in combination: flexible heat transfer means extending along said path and having two opposing sides so that one of said sides comes into contact with at least some portion of sealable material of a package which is being moved along said path; flexible heat generating means comprising a plurality of separate heat generating segments secured directly to the other side of said flexible heat transfer means to provide heat thereto for transferring heat to said sealable material coming in contact with said one side of said flexible heat transferring means, each generating segment connected with independent and separate energy source means and formed so that the heat generating segment disposed closest to said entrance location on each of said first and second transfer means provides more heat to sealable material coming in contact therewith than any other of said heat generating segments and force exertion means disposed along the length of said path to come into contact with each of said plurality of flexible heat generating means, and formed to segmentally push said flexible heat generating means which in turn pushes said flexible heat transfer means into contact with said sealable material along the length of said path.

2. A sealing station according to claim 1 wherein said flexible heat transfer means in a low mass device.

3. A sealing station according to claim 1 wherein said force exertion means comprises leaf spring means disposed to push said flexible heat transfer means partially into said path to cause said flexible heat transfer means to come in contact with said at least a part of sealable material of a package being moved along said path means.

4. A sealing station according to claim 1 wherein said flexible heat generating means is secured to said flexible heat transfer means by a bonding material which is an electrical insulation material and which can withstand high temperature without deterioration.

5. A sealing station according to claim 4 wherein there is further included spring means disposed to come in contact with said bonding means and formed to push said flexible heat transfer means, by pushing said said bonding means at least partially into a path defined by said path means to cause said heat transfer means to come in contact with said at least part of some sealable material of a package being moved along said path means.

6. A sealing station according to claims 3 or 5 wherein said spring means is a leaf spring formed to have each leaf pushing a different section of said flexible heat generating means and therefore a different section of said flexible heat transfer means.

7. A sealing station according to claim 1 wherein said flexible heating generating means comprises of meandering electrical resistance segments with each such segment adapted to be connected to an independent power source.

8. A sealing station according to claim 1 wherein each end of said flexible heat transfer means is formed into a loop which loop is fitted over a pin member and further wherein a slotted tube is fitted over said loop and said pin and wherein said slotted tube is secured to hold said flexible heat transfer member.

9. A sealing station according to claim 8 wherein there is further included spring loaded members each of which is disposed in proximity to an associated one of said slotted tubes and further disposed to push said flexible heat transfer means in a direction which is substantially 180° from another spring loaded member pushing said flexible heat transfer means to thus act in conjunction with an associated pin and slotted tube to hold said flexible heat transfer means in tension.

10. A sealing station according to claim 1 wherein said flexible heat transfer means is a low mass means fabricated from stainless steel and having a thickness of 0.005 inches.

11. A sealing station, having an entrance location and an exit location, for sealing at least part of some sealable material which sealable material makes up at least part of a package, wherein said package is moved along a path through said sealing station comprising in combination: first and second low mass flexible heat transfer means disposed opposite to one another to form said path and having sides facing each other between which said packages having said part of said sealable material to be sealed are transported; first and second pluralities of independent and separate heat generating members; first and second electrical insulating means formed and disposed to respectively directly house and secure said first plurality of heat generating members to the side of said first low mass flexible heat transfer means facing away from the second transfer means and said second plurality of heat generating members to the side of said second low mass flexible heat transfer means facing away from the first transfer means; and first and second leaf spring means respectively formed and disposed to push segmentally against each of said first and second electrical insulating means to in turn respectively push said first and second low mass heat transfer means to conform and come in contact with said part of some sealable material to transfer heat thereto and exert pressure thereon to effect a seal thereof each generating segment connected with independent and separate energy source means and formed so that the heat generating segment disposed closest to said entrance location on each of said first and second transfer means provides more heat to sealable material coming in contact therewith than any other of said heat generating segments.

* * * * *